Figure 1:
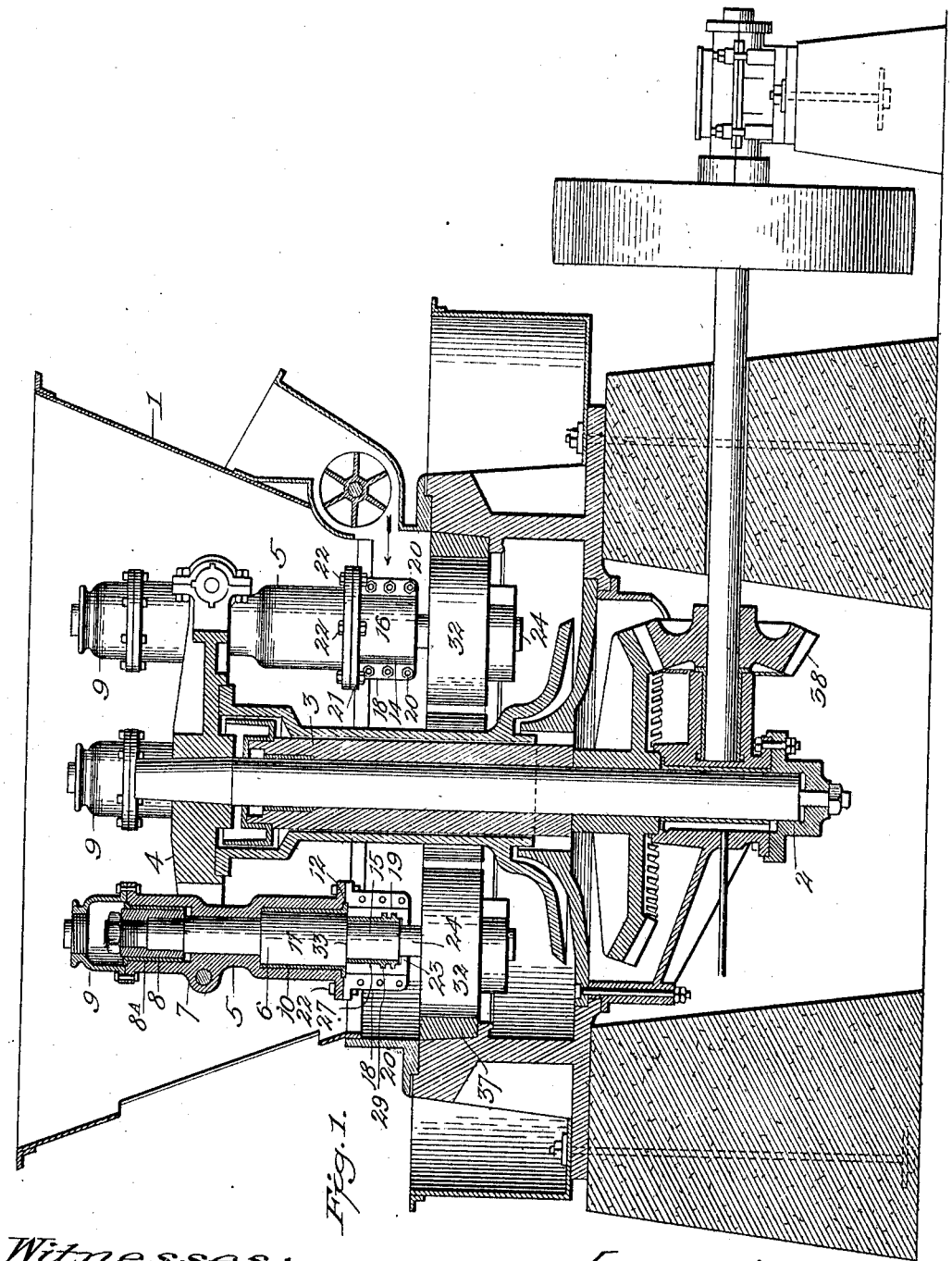

H. SCHWARZ.
STUFFING BOX FOR ROLLER SHAFTS.
APPLICATION FILED FEB. 4, 1910.

970,564.

Patented Sept. 20, 1910.

2 SHEETS—SHEET 1.

Witnesses:
G. Sargent Elliott
Adella M. Fowle

Inventor:
Henry Schwarz
By H. S. Bailey, Attorney.

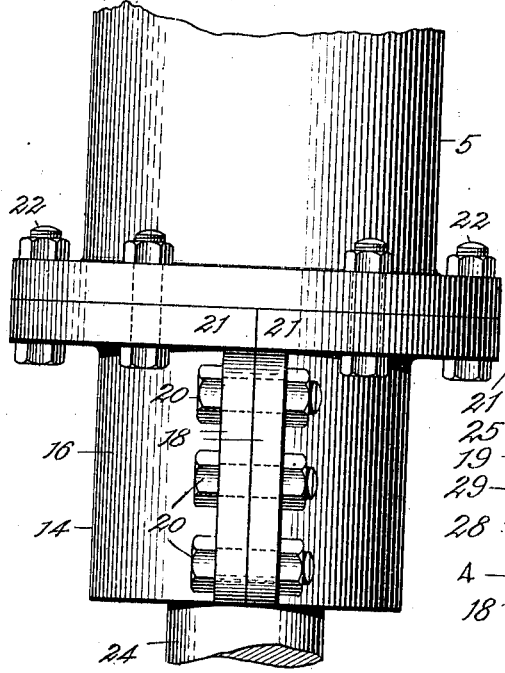

UNITED STATES PATENT OFFICE.

HENRY SCHWARZ, OF DENVER, COLORADO.

STUFFING-BOX FOR ROLLER-SHAFTS.

970,564.  Specification of Letters Patent.  Patented Sept. 20, 1910.

Application filed February 4, 1910. Serial No. 542,057.

*To all whom it may concern:*

Be it known that I, HENRY SCHWARZ, a citizen of the United States of America, residing in the city and county of Denver and State of Colorado, have invented a new and useful Stuffing-Box for Roller-Shafts, of which the following is a specification.

My invention relates to improvements in stuffing boxes for the roller shafts of roller mills for crushing, grinding and pulverizing ore, rock, lime and other materials, and the objects of my invention are: first—to provide a stuffing box for the roller shaft bearings of mills that will prevent the grit from working into the journal bearings of the roller shaft. Second—to provide a stuffing box to protect the journal bearings of the roller shafts of ore, rock, cement and other material grinding mills against gritty dust, and that also in a measure acts as a supporting bearing for the roller shaft; and third—to provide a simple, inexpensive and a long lived stuffing box that is quickly and easily removed and a new stuffing box substituted for it without detaching the roller shaft from its journal bearings and its supporting spider arm, and that will prevent gritty dust from working into the journal bearings of the roller shaft. I attain these objects by the mechanism illustrated in the accompanying drawings, in which—

Figure 1 designates a longitudinal, vertical, sectional elevation through a machine embodying my invention. Fig. 2 is a side view of the stuffing box looking in the direction of the arrow in Fig. 1. Fig. 3 is a view showing the bushing at the lower end of the roller shaft in section, one member of the stuffing box being removed. Fig. 4 is a sectional view on the line 4—4 of Fig. 3; and Fig. 5 is an edge view of one member of the stuffing box.

Similar letters of reference refer to similar parts throughout the several views.

Referring to the drawings, the numeral 1 designates the hopper frame of a roller mill to which my invention is applied; 2 designates the vertical driving shaft; 3 designates the vertical journal bearing for the shaft; 4 designates the spider arm casting, the outer ends of which support the housing sleeves 5 of the roller shafts 6, to which my stuffing box is applied. This spider arm casting is pivotally secured to a trunnion bearing cap 7, which is formed on the housing sleeve 5. A journal sleeve 8 is placed within the housing sleeve 5 around the upper end of the roller shaft 6, and is surrounded by a bushing 8$^A$. This journal sleeve is inclosed by a housing cap 9, which is bolted to the housing sleeve.

In the lower end and central portion of the housing sleeve a bushing 10 is fitted, which surrounds the body portion 11 of the roller shaft 6 and forms its lower journal bearing. The lower end of this bushing 10 is provided with a flange 12, which is seated partially in a counterbore 13 formed in the lower edges of the sleeve and partially in a counterbore 13$^A$, formed in a two-part stuffing box 14, which is fitted over a reduced portion 15 of the roller shaft, that is formed on the lower end of the body portion 11. This stuffing box 14 comprises a centrally divided, equally halved, cylindrical casing portion 16, adapted to receive a bushing. Each half of this casing is provided with vertical edge flanges 18, which are machine finished and are arranged to register with each other, and the adjoining faces of the flanges are preferably provided with rabbeted, interlocking shoulders 19, which are arranged and adapted to hold these halves rigidly in fixed relative relation to each other against lateral strains parallel with the faces of their registering flanges. These two half parts of the stuffing box are bolted together by bolts 20, which extend through their flanges; and they are also provided with a top edge flange 21, which is also machine finished to fit close up against the under side of the lower end of the housing sleeve, to which it is bolted by bolts 22. After being bolted together, this stuffing box is provided with an axial bore 23, which is formed through the casing from its lower end, which fits rotatably on a reduced portion 24, formed on the roller shaft 6, which reduced portion projects into the lower end of the boxing a short distance. An axial bore 25 is formed in the boxing, which is of greater diameter than the bearing portion 15 of the roller shaft 5, and is adapted to receive a bushing 27, which is mounted on and is secured to the portion 15 of the roller shaft in any suitable manner. This bushing 27 is adapted to be rotated by the roller shaft 5 within the stuffing box casing, as will be fully described hereinafter. The larger axial bore 25 of the casing is provided with annular grooves 28, and projecting collar portions 29 are formed on the outer peripheral surface of the bushing and are arranged to fit rotatably in the grooves of the casing. A slight clearance space 30 is preferably formed between the lower end of the bushing and the shoulder 31 formed at the junction of the bores 23 and 25, which permits the weight on downward thrust of the roller shaft and its roller 32 to be carried by the grooves in the stuffing box.

My invention contemplates a bushing of any suitable anti-friction material or journal bearing material fitted tightly on the shaft and extending up against a square shoulder 33 formed on the roller shaft 6 at the junction of its stuffing box bearing portion 15 with its main body portion 11 and is secured to the roller shaft by any suitable means. I preferably, however, carry out this feature of my invention in the following manner: At the lower end of the bushing and of the portion 15 of the roller shaft I form one or two or more threaded apertures 35 which are drilled partially into the bushing and partially into the shaft, thus forming round threaded keyways, in which headless screws 36 are threaded, a screw driver slot being provided in the head of the screw to enable them to be screwed into the threaded keyways. These threaded screws form threaded keys, and they are arranged so that their heads will be flush with the end of the bushing and the bushing bearing portion 15 of the shaft, and as these two parts are adjacent to the inner face of the shoulder of the lower portion of the stuffing box, it is impossible for them to work out of their threaded keyways.

Upon the lower end portion 24 of the roller shaft a lime or ore or rock crushing, grinding and pulverizing roller is secured, which is arranged to roll against the vertically disposed face of a die ring 37, that is mounted in the mill and against which it rolls, as it is held by centrifugal force as the driving shaft 2 of the mill with its spider arm rotates within the hopper frame of the mill.

The operation is as follows: When the main driving shaft is rotated by the bevel gearing 38, which is connected to a suitable source of rotative power, the spider arm's casting and the housing sleeve of the roller shaft are carried around with it, and as the housing sleeve is pivotally connected to the spider arm to swing radially outward the roller of the roller shaft is held against the die ring by centrifugal force, and the roller rolls on its surface and crushes, grinds and pulverizes any material that is fed between them from the feed hopper, and as the roller is secured to the roller shaft it rotates also in its journal sleeves or bushings 8$^A$ and 10 within the housing sleeve, and the bushing 27 of the stuffing box being keyed to the shaft rotates with it in the stuffing box and in the grooves of the stuffing box, and as the collars of the bushing fit snugly within the grooves of the stuffing box the grit and dust grit, which abounds in all crushing, grinding and pulverizing mills, cannot work past them up into the journal bearing sleeves 8$^A$ 8$^C$ and 10 of the main portion of the roller shaft.

Suitable provision is made at the top end of the shaft, within the housing cap, for oiling the shaft bearings which feature, as well as the various features of the mill illustrated, forms but a coöperating part of my invention, as such mills are in common use for crushing, grinding and pulverizing lime, ore, rock and various other materials.

Having described my invention, what I claim as new and desire to secure by Letters Patent is:

1. In a stuffing box, the combination of the housing sleeve and a shaft, and a journal bushing secured in said housing sleeve and arranged to fit said shaft rotatably, said shaft having a reduced portion below said housing sleeve, with a stuffing box comprising a journal sleeve keyed on the reduced portion of said shaft and provided with projecting collar portions, said shaft having a reduced portion on said shaft below said journal sleeve and the portion of said shaft on which said sleeve is secured, and a two-part casing arranged to be clamped around said shaft's sleeve in such a manner as to form a journal box bearing for said sleeve, said casing having a collar portion formed on the lower edge of each part thereof extending underneath the lower end of said sleeve to the reduced portion of said shaft.

2. In a stuffing box, the combination of the housing sleeve and its bushing with the shaft, a journal bearing sleeve on said shaft below said housing sleeve and its bushing, said journal bearing sleeve being provided with projecting collars, means for securing said journal bearing sleeve to said shaft, and a two-part casing provided with edge flanges adapted to be bolted together, axial journal bearing apertures of two diameters in said united parts of said casing adapted to receive revolubly said shaft's journal bearing sleeve, said casing being provided with counterbored grooves arranged and adapted to receive said bearing sleeve's projecting collar portions, said casing being adapted to project under and over the lower end of said shaft's sleeve to said shaft, said casing having shouldered, intermeshing, registering surfaces on the meeting surfaces of the half parts adapted to hold said half parts in alinement when secured together against movement upon each other, and means for securing said united two-part casing to said housing sleeve.

In testimony whereof I affix my signature in presence of two witnesses.

HENRY SCHWARZ.

Witnesses:
G. SARGENT ELLIOTT,
ADELLA M. FOWLE.